UNITED STATES PATENT OFFICE.

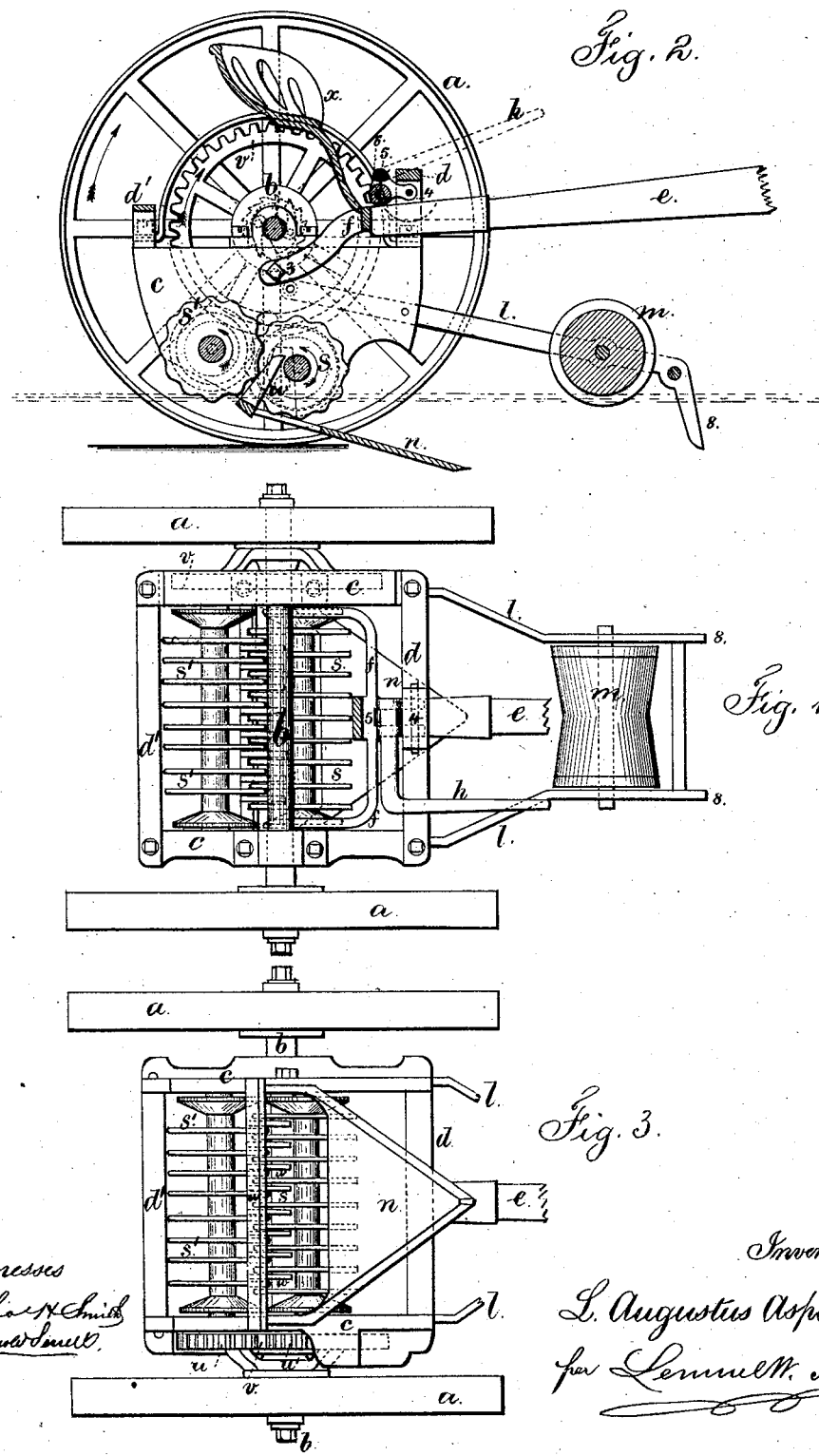

L. AUGUSTUS ASPINWALL, OF ALBANY, NEW YORK.

IMPROVEMENT IN POTATO-DIGGERS.

Specification forming part of Letters Patent No. 155,215, dated September 22, 1874; application filed July 28, 1874.

To all whom it may concern:

Be it known that I, L. AUGUSTUS ASPINWALL, of Albany, in the county of Albany and State of New York, have invented an Improvement in Potato-Diggers, of which the following is a specification:

Potato-diggers have been made with a plow to raise the earth and potatoes and deliver the same upon an apron or upon ranges of revolving fingers. These devices are either inefficient in separating the earth from the potatoes, or else the potatoes are injured by falling in between the revolving fingers.

My potato-digger is made with a frame hanging from an axle that is supported by wheels. The draft-pole is connected to the frame, and a self-setting lever serves to depress the digger or raise the same. A blade or share is attached to the under side of the frame and passes into the earth below the potatoes. The vines are gathered into a row by a fork that projects forward, and a roller is used to press upon the vines to consolidate the mass sufficiently to prevent the machine being obstructed, and said roller also gages the distance that the share is allowed to pass into the ground. One or more gangs of revolving disks are placed immediately behind the share, and these are, by preference, corrugated at their edges or made waving, so as more easily to act in lifting the potatoes up out of the earth, and supporting them and the vines, while the earth falls back through between the disks, and the machine passes below the potatoes and vines, and leaves them upon the surface to dry and be gathered.

In the drawing, Figure 1 is a plan of the machine. Fig. 2 is a central vertical section, and Fig. 3 is an inverted plan of the share and frame.

The wheels $a$ are upon the axle or shaft $b$, and connected thereto by inclosed ratchets, as usual in mowing-machines. The shaft $b$ supports the side frames $c$ $c$, and these are connected by the cross-bearers $d$ $d'$, and the pole or tongue $e$ passes beneath the bearer $d$, and is connected, by a yoke, $f$, to the frames $c$ below the axle $b$, so that the draft of the machine tends to lift the front part. The position of the attaching-bolts 3, and consequent point of draft, may be changeable. The bearer $d$ is made with a vertical slot or recess for the tongue $e$, and in this recess is a swinging lever, $h$, that is hinged at 4, and has a roller, 5, so that when the lever and roller are turned into the position shown in Fig. 2 the front part of the machine will be lowered so as to be applied in digging potatoes, and when the lever $h$ is moved the other way the roller 5 presses upon the tongue, and the entire digger is raised sufficiently to permit the machine to be driven to or from the field, and the roller 5 passing slightly beyond the fulcrum-pin 4, the heel 6 and roller 5 both rest upon the tongue; hence the lever is self-setting, and remains in position without requiring pawls or stops. To the frames $c$ $c$ the arms $l$ are attached, and they are, by preference, adjustable so as to be raised or lowered, and these arms $l$ carry a roller, $m$, that rests upon the vines with sufficient force to press them into a consolidated form, as the two gatherers 8 8 at the ends of the arm $l$ cause the weeds and vines to lie along upon the row, such gatherers passing at each side of the row, and dividing the weeds and vines upon the row from those in the trenches or furrows.

It is to be understood that when in use the wheels $a$ $a$ run in the furrows, and that the gatherers 8 and roller $m$ prepare the vines and weeds in such a manner that the digging operation is not interfered with by such weeds or vines, and they lie straight upon the row and do not become clogged in the machine, and the roller gages the depth of cut by the machine.

The share $n$ is attached to the under side of the frames $c$ $c$, and in the rear of the forward separator, so as to obtain the proper angle for cutting through the hills and lessen the resistance. The share is triangular and lifts the earth, but the earth does not bank upon the share. Between the frames $c$ $c$ are one or more gangs of disks, $s$ $s'$. I have shown two such gangs. Each disk is made with the edge rounding, so as not to be sharp to cut or injure the potatoes. It is also preferable to make the edges of the disks corrugated or undulating, or both. I have shown them as undulating, and the disks are to be so close together in the gangs that potatoes will not fall down between the disks, and the center shaft of each gang is supported in suitable bearings in the frames $c$.

A rotary motion is given to each gang in the direction indicated, and for this purpose the pinions $u$ $u'$ and the wheel $v$ on the axle $b$ are employed. It is preferable that the surface travel of the rear gang of revolving disks should be greater than that of the forward gang, so that the rear gang will aid in clearing the front gang, and this may be accomplished by using a smaller pinion, $u'$, or larger disks $s'$.

As the machine advances and the earth presses upon the disks the upward revolving movement of their forward edges serves to break up the earth and lift out the potatoes, and the earth passes down and between the disks, and the vines and potatoes are passed along over the disks and delivered upon the surface behind the machine. The comb or cleaner-rake $w$, that is fixed between the frames $c$, with teeth extending up between the disks $s$ $s'$, serves to prevent the earth or stones becoming packed in the gangs of revolving disks and clean the said disks.

The driver, sitting on the seat $x$, can raise the machine out of operation by the lever $h$, and easily observe the operation in digging and delivering the potatoes.

The disks $s$ $s'$ may be made in sections placed together alternately, or to form spiral separators, if desired.

I claim as my invention—

1. The combination, in a potato-digger, of one or more gangs of revolving disks, substantially as and for the purposes set forth.

2. The stationary clearing-rake $w$, in combination with the gang of revolving disks $s$ $s'$ and share $n$, as and for the purposes set forth.

L. AUGS. ASPINWALL.

Witnesses:
  E. A. GRIFFIN,
  G. G. DAVIDSON.